UNITED STATES PATENT OFFICE.

AUGUST GOTTHILFF, OF NEW YORK, N. Y.

IMPROVEMENT IN THE METHOD OF PROTECTING TIMBER FROM DESTRUCTION BY WORMS, DRY-ROT, OR OTHER PROCESSES OF SPONTANEOUS DECAY.

Specification forming part of Letters Patent No. 232, dated June 14, 1837.

*To all whom it may concern:*

Be it known that I, AUGUST GOTTHILFF, of the city of New York, in the State of New York, have invented a Method of Protecting Timber from Destruction by Worms, Dry-Rot, or other Processes of Spontaneous Decay by the application of materials thereto which have not heretofore been applied to the same purpose in the same way; and I do hereby declare that the following is a full and exact description thereof.

I saturate the timber with either of the following articles, either alone or combined with common salt, or I use two or more of them so mixed or combined, as may be preferred—that is to say, I take common vegetable tar, pitch, the tar-like residuum from the manufacture of illuminating-gas in gas-works, where animal or vegetable oil, rosin, a mixture of oil and rosin, or any vegetable, oleaginous, or resinous substance is employed for the production of the gas, and melt or combine them together in such proportions as may appear best, adding in most cases to these resinous materials, and more especially when the timber to be saturated is of a very porous kind, from one-eighth to one-fourth part of their weight of common salt. As these materials are to enter and fill the pores of the wood by the aid of heat, it may be necessary sometimes to dilute them, and this I do by means of spirits of turpentine or of an analogous solvent distilled from any of the above-enumerated materials. This, however, will rarely be necessary. To effect perfect saturation, I place the timber and the resinous materials together, in suitable metallic troughs or tanks, the quantity of the resinous matter being sufficient to cover the timber, when the whole is submitted to a temperature of from 300° to 400° of Fahrenheit's scale for a term which may vary from one to twelve or more hours, depending upon the size and nature of the timber, after which the redundant heated fluid is to be drawn off, when it will be found that the timber will be saturated throughout. The well-known processes of exhaustion and pressure may be applied to promote the saturation; but it is not believed that this will ever be required.

What I claim as constituting my invention is—

The application of the tar, pitch, and other analogous materials obtained from vegetable substances by the agency of heat to the various kinds of timber, in the manner described, so as completely to saturate the same, using these resinous materials in some cases in combination with common salt; but it is to be distinctly understood that I claim the saturating of timber with the vegetable products within mentioned by submerging the timber therein in a heated state without as well as with the addition of common salt.

AUGUST GOTTHILFF.

Witnesses:
   THOS. P. JONES,
   JAMES TREAT.